US012065041B2

(12) United States Patent
Tsukizaki (10) Patent No.: US 12,065,041 B2
(45) Date of Patent: Aug. 20, 2024

(54) DRIVING FORCE CONTROL METHOD AND DRIVING FORCE CONTROL DEVICE

(71) Applicant: Nissan Motor Co., Ltd., Yokohama (JP)

(72) Inventor: Atsushi Tsukizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/688,939

(22) PCT Filed: Sep. 6, 2021

(86) PCT No.: PCT/JP2021/032724
§ 371 (c)(1),
(2) Date: Mar. 4, 2024

(87) PCT Pub. No.: WO2023/032222
PCT Pub. Date: Mar. 9, 2023

(65) Prior Publication Data
US 2024/0239207 A1     Jul. 18, 2024

(51) Int. Cl.
*B60L 15/20*     (2006.01)
*B60L 15/38*     (2006.01)

(52) U.S. Cl.
CPC ............... *B60L 15/20* (2013.01); *B60L 15/38* (2013.01)

(58) Field of Classification Search
CPC ...................................................... B60L 15/20
See application file for complete search history.

(56) References Cited

U.S. PATENT DOCUMENTS

| 3,997,941 A | * | 12/1976 | Muller | .................. | A22C 11/02 |
| | | | | | 452/41 |
| 2008/0004780 A1 | * | 1/2008 | Watanabe | .............. | B60K 6/445 |
| | | | | | 903/917 |
| 2008/0109125 A1 | * | 5/2008 | Hahn | .................... | B60W 10/06 |
| | | | | | 903/945 |
| 2010/0151988 A1 | * | 6/2010 | Tabata | .................. | B60K 6/445 |
| | | | | | 318/434 |
| 2020/0269702 A1 | * | 8/2020 | Meyer | .................... | B60L 50/15 |

FOREIGN PATENT DOCUMENTS

| JP | 2008-006945 A | 1/2008 |
| JP | 2013-085375 A | 5/2013 |
| JP | 2018-057169 A | 4/2018 |

\* cited by examiner

*Primary Examiner* — Jason D Shanske
*Assistant Examiner* — James J Triggs
(74) *Attorney, Agent, or Firm* — Young Basile Hanlon & MacFarlane, P.C.

(57) ABSTRACT

As a control mode for determining the torque distribution, set is either an in-phase mode in which respective positive and negative of output torque of the motors coincide with each other, or an out-of-phase mode in which the respective positive and negative of the output torque of the motors are different from each other. A distribution adjustment control is executed to adjust the torque distribution when the control mode is mutually transitioned between the in-phase mode and the out-of-phase mode. In the distribution adjustment control in a free running period of first output torque whose positive and negative are inverted at a time of transitioning the control mode, second output torque whose positive and negative are not inverted is adjusted to approach the total requested torque.

6 Claims, 7 Drawing Sheets

DRIVING FORCE CONTROL METHOD AND DRIVING FORCE CONTROL DEVICE

TECHNICAL FIELD

The present invention relates to a driving force control method and a driving force control device.

BACKGROUND ART

In JP 2013-85375 A, a driving force control device that controls a behavior of a vehicle body by controlling driving force of a front wheel and driving force of a rear wheel is proposed. In particular, in the driving force control device, from the viewpoint of obtaining a desired pitch behavior of the vehicle body, control is performed to mutually reverse directions of the driving force of the front wheel and the driving force of the rear wheel (power one and regenerate the other).

In particular, in the driving force control device, during a free running period (period in which driving force is not transmitted due to a phase delay of a drive transmission system such as a backlash of a speed reducer) before and after positive and negative of output torque of one of a front wheel motor and a rear wheel motor are inverted, output torque of the other is maintained constant.

SUMMARY OF INVENTION

According to the driving force control of JP 2013-85375 A, during the free running period of the one output torque, the other output torque is also constant, so that sum output torque thereof is also constant, which reduces the sense of discomfort given to an occupant.

However, when total requested driving force (total requested torque) for the vehicle changes (when the vehicle is accelerated or decelerated) in a control period including the free running period in which the sum output torque is constant, there is a problem that a deviation occurs between the total requested torque and the sum output torque at least during the free running period, and a difference in front-rear acceleration of the vehicle occurs.

Therefore, an object of the present invention is to provide a driving force control method and a driving force control device capable of more reliably reducing a difference in front-rear acceleration when positive and negative of output torque of one of a front wheel motor and a rear wheel motor are inverted.

According to an aspect of the present invention, provided is a driving force control method for controlling torque distribution of a front wheel motor that drives a front wheel and a rear wheel motor that drives a rear wheel to satisfy total requested torque of a vehicle by sum output torque of the motors. In this driving force control method, as a control mode for determining the torque distribution, set is either an in-phase mode in which respective positive and negative of output torque of the motors coincide with each other or an out-of-phase mode in which the respective positive and negative of the output torque of the motors are different from each other. And then, executed is distribution adjustment control of adjusting the torque distribution when the control mode is mutually transitioned between the in-phase mode and the out-of-phase mode. Especially in the distribution adjustment control in a free running period of first output torque whose positive and negative are inverted at a time of transitioning the control mode, second output torque whose positive and negative are not inverted is adjusted to approach the total requested torque.

DESCRIPTION OF EMBODIMENTS

Hereinafter, embodiments of the present invention will be described in detail with reference to the drawings.

[Prerequisite Configuration]

Figure 1:
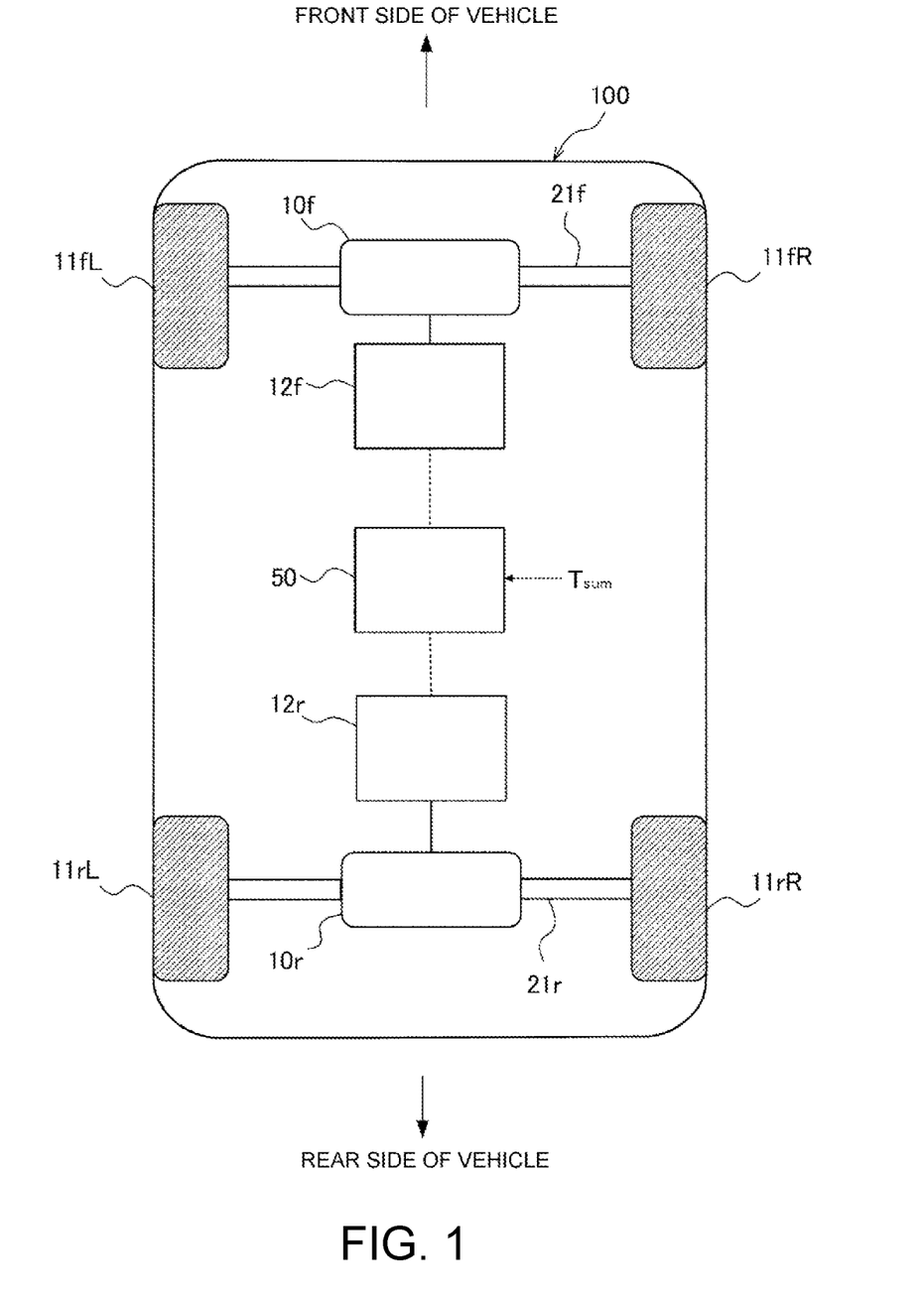
FIG. 1 is a diagram illustrating a prerequisite configuration of a vehicle on which a driving force control method according to each embodiment of the present invention is executed.

FIG. 1 is a diagram illustrating a prerequisite configuration of a vehicle 100 in which a driving force control method according to each embodiment is executed.

As the vehicle 100, an electric vehicle, a hybrid vehicle, or the like, which includes a drive motor 10 serving as a driving source and can travel by driving force of the drive motor 10, is assumed.

The drive motor 10 includes a front wheel motor 10f provided at a front position (front wheel side) of the vehicle 100 to drive front wheels 11f, and a rear wheel motor 10r provided at a rear position (rear wheel side) to drive rear wheels 11r.

The front wheel motor 10f is implemented by a three-phase AC motor. During power running, the front wheel motor 10f is supplied with electric power from an in-vehicle battery (not shown) to generate driving force. The driving force generated by the front wheel motor 10f is transmitted to the front wheels 11f via a front wheel transmission 16f and a front wheel drive shaft 21f. On the other hand, during regeneration, the front wheel motor 10f converts regenerative braking force of the front wheels 11f into AC power and supplies the AC power to the in-vehicle battery.

On the other hand, the rear wheel motor 10r is implemented by a three-phase AC motor. During power running, the rear wheel motor 10r is supplied with the electric power from the in-vehicle battery to generate driving force. The driving force generated by the rear wheel motor 10r is transmitted to the rear wheels 11r via a rear wheel transmission 16r and a rear wheel drive shaft 21r. During regeneration, the rear wheel motor 10r converts regenerative braking force of the rear wheels 11r into AC power and supplies the AC power to the in-vehicle battery.

An inverter 12 includes a front wheel inverter 12f that adjusts the electric power (positive in the power running and negative in the regeneration) supplied to the front wheel motor 10$f$, and a rear wheel inverter 12$r$ that adjusts the electric power (positive in the power running and negative in the regeneration) supplied to the rear wheel motor 10$r$.

The front wheel inverter 12$f$ adjusts the electric power supplied to the front wheel motor 10$f$ such that front torque $T_f$ corresponding to total requested torque $T_{sum}$ corresponding to total driving force requested for the vehicle 100 is achieved. The front torque $T_f$ is output torque of the front wheel motor 10$f$ corresponding to the driving force (or the regenerative braking force) output by the front wheel motor 10$f$. On the other hand, the rear wheel inverter 12$r$ adjusts the electric power supplied to the rear wheel motor 10$r$ such that rear torque $T_r$ corresponding to the total requested torque $T_{sum}$ is achieved. The rear torque $T_r$ is output torque of the rear wheel motor 10$r$ corresponding to the driving force (or the regenerative braking force) output by the rear wheel motor 10$r$.

In particular, torque distribution of the front torque $T_f$ and the rear torque $T_r$ according to the total requested torque $T_{sum}$ is basically determined such that a sum of the front torque $T_f$ and the rear torque $T_r$ (hereinafter also referred to as "sum torque $T_{f+r}$") matches the total requested torque $T_{sum}$. The total requested torque $T_{sum}$ is determined based on, for example, an operation amount (accelerator opening APO) for an accelerator pedal performed by an occupant of the vehicle 100, or a command from a prescribed autonomous driving system (autonomous driving control device) such as an advanced driver assistance systems (ADAS) or autonomous driving (AD).

Further, the vehicle 100 is provided with a controller 50 as a driving force control device that controls the torque distribution. The controller 50 is implemented by a computer including a central processing unit (CPU), a read-only memory (ROM), a random access memory (RAM), and an input/output interface (I/O interface), and is programmed so as to execute each processing in vehicle control to be described below. In particular, a function of the controller 50 can be achieved by any in-vehicle computer such as a vehicle control module (VCM), a vehicle motion controller (VMC), and a motor controller, and/or a computer provided outside the vehicle 100. The controller 50 may be implemented by one piece of computer hardware, or may be implemented by distributing various processes by a plurality of pieces of computer hardware.

The controller 50 determines a command value of the front torque $T_f$ (hereinafter also referred to as "command front torque $T^*_f$") and a command value of the rear torque $T_r$ (hereinafter also referred to as "command rear torque $T^*_r$") according to desired torque distribution, using the total requested torque $T_{sum}$, detection results of sensors (not shown), and the like as input information. Further, the controller 50 commands the front wheel inverter 12$f$ and the rear wheel inverter 12$r$ such that an actual value of the front torque $T_f$ (hereinafter also referred to as "actual front torque $T_{f\_re}$") and an actual value of the rear torque $T_r$ (hereinafter also referred to as "actual rear torque $T_{r\_re}$") follow the command front torque $T^*_f$ and the command rear torque $T^*_r$.

In particular, in each of the embodiments to be described later, the controller 50 sets, as a control mode for determining the torque distribution, either an in-phase mode in which respective positive and negative of the front torque $T_f$ and the rear torque $T_r$ are the same sign, or an out-of-phase mode in which the respective positive and negative thereof differ.

The in-phase mode is a control mode that defines the torque distribution such that vehicle characteristics have desired characteristics during acceleration and deceleration of the vehicle 100. In particular, in the in-phase mode during the acceleration, a distribution ratio k of the front torque $T_f$ and the rear torque $T_r$ is in a range of 0 to 100:100 to 0, and is set to a basic distribution ratio (for example, 50:50) that achieves preferable vehicle characteristics during the acceleration. On the other hand, in the in-phase mode during the deceleration, the distribution ratio k of the front torque $T_f$ and the rear torque $T_r$ is in a range of −100 to 0:0 to −100, and is set to a basic distribution ratio (for example, −50:−50) that achieves preferable vehicle characteristics during the deceleration. Hereinafter, in the in-phase mode during the acceleration or the deceleration, the torque distribution based on the basic distribution ratio that achieves the preferable vehicle characteristics is also referred to as "in-phase basic distribution". The basic distribution ratio in the in-phase basic distribution may be a fixed value or a variable value that varies within the above range.

A concept of the vehicle characteristics assumed in each embodiment includes, for example, a characteristic (power consumption performance) related to an efficiency of energy consumed by an operation such as traveling of the vehicle 100, a characteristic (slip performance) related to difficulty of slipping of the front wheel 11$f$ or the rear wheel 11$r$, and followability (power performance) of actual front-rear acceleration with respect to the total requested torque $T_{sum}$.

On the other hand, the out-of-phase mode is a control mode that defines the torque distribution requested in control of achieving specific vehicle behavior according to various driving scenes during the acceleration and the deceleration of the vehicle 100. The control of achieving the specific vehicle behavior includes, for example, control (pitch control) of adjusting a pitch behavior of the vehicle body to reduce a vibration transmitted to the occupant in a scene in which the vehicle 100 travels on a step or an unevenness, an control of increasing traveling performance of the vehicle 100 in a situation in which the vehicle 100 travels on a special road surface. Hereinafter, torque distribution based on a preferable basic distribution ratio from the viewpoint of achieving a desired vehicle behavior in the out-of-phase mode during the acceleration or the deceleration is also referred to as "out-of-phase basic distribution".

In particular, the out-of-phase basic distribution includes front wheel regeneration distribution and rear wheel regeneration distribution according to a target vehicle behavior.

In the front wheel regeneration distribution, the command front torque $T^*_f$ is set to a negative value, and the command rear torque $T^*_r$ is set to a positive value. That is, the front wheel motor 10$f$ is regenerated (the front wheels 11$f$ are regeneratively braked), and the rear wheel motor 10$r$ is powered (the rear wheels 11$r$ are power-driven).

In the rear wheel regeneration distribution, the command front torque $T^*_f$ is set to a positive value, and the command rear torque $T^*_r$ is set to a negative value. That is, the front wheel motor 10$f$ is powered (the front wheels 11$f$ are power-driven) and the rear wheel motor 10$r$ is regenerated (the rear wheels 11$r$ are regeneratively braked).

In particular, in the driving force control method according to each embodiment, when the control mode is transitioned between the in-phase mode and the out-of-phase mode, distribution adjustment control is executed to prevent a deviation of the sum torque $T_{f+r}$ (more specifically, actual sum torque $T_{f+r\_re}$) with respect to the total requested torque $T_{sum}$ in a free running period due to a backlash caused when either the actual front torque $T_{f\_re}$ or the actual rear torque $T_{r\_re}$ crosses zero. Hereinafter, the distribution adjustment control will be described.

In the present description, the "free running period" means a period in which driving force actually transmitted to a driving wheel cannot sufficiently follow a command value of output torque of a motor due to a phase delay (for example, a backlash in a speed reducer or the like) of a driving force transmission system from the motor to the driving wheel when positive and negative of the output torque of the motor are inverted. In the following description, in particular, a free running period occurring due to a driving force transmission system between the front wheel motor 10$f$ and the front wheels 11$f$ is referred to as a "front free running period", and a free running period occurring due to a driving force transmission system between the rear wheel motor 10$r$ and the rear wheels 11$r$ is referred to as a "rear free running period". The terms "actual front torque $T_{f\_re}$" and "actual rear torque $T_{r\_re}$" described above mean torque corresponding to driving force transmitted to the front wheels 11$f$ and the rear wheels 11$r$ actually transmitted to the driving wheels via the driving force transmission systems, respectively.

[Distribution Adjustment Control]

Figure 2:
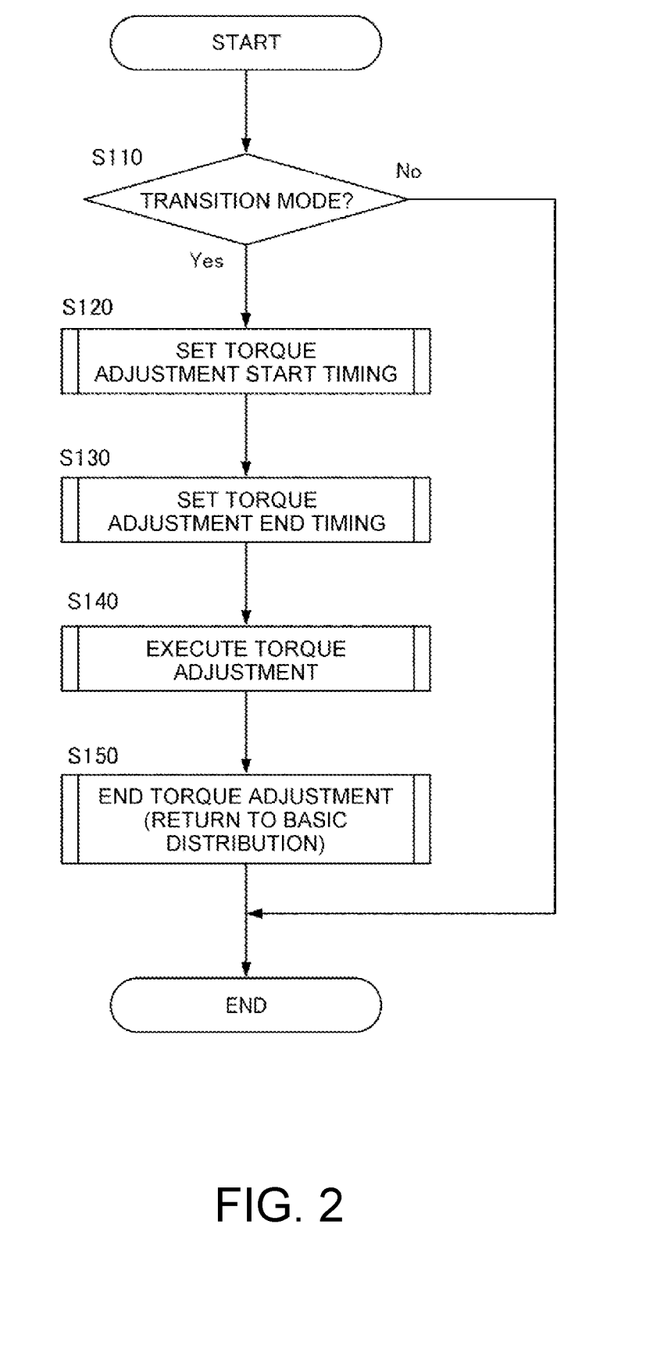
FIG. 2 is a flowchart illustrating distribution adjustment control.

FIG. 2 is a flowchart illustrating control logic of the distribution adjustment control common to each embodiment. During the acceleration or the deceleration of the vehicle 100, the controller 50 repeatedly executes processes shown in FIG. 2 at prescribed calculation intervals.

In step S110, the controller 50 determines whether a request to transition the control mode between the out-of-phase mode and the in-phase mode has occurred. For example, the controller 50 executes the determination based on input information acquired from various sensors mounted on the vehicle 100 and/or a prescribed external server.

Next, in step S120, the controller 50 sets a torque adjustment start timing. Specifically, the controller 50 determines a suitable timing for starting adjustment of command torque before the free running period in which the positive and the negative of the torque are reversed.

Hereinafter, in a case in which the front torque $T_f$ (command front torque $T^*_f$) is adjusted at the time of the transition of the control mode, a timing at which the adjustment is started is also referred to as a "front torque adjustment start time $t_{f\_s}$". On the other hand, in a case in which the rear torque $T_r$ (command rear torque $T^*_r$) is adjusted, a timing at which the adjustment is started is also referred to as a "rear torque adjustment start time $t_{r\_s}$".

Further, in step S130, the controller 50 sets a torque adjustment end timing. Specifically, the controller 50 determines a suitable timing for ending torque adjustment after the free running period in which the positive and the negative of the torque are reversed.

Hereinafter, when the command front torque $T^*_f$ is adjusted at the time of the transition of the control mode, a timing at which the adjustment is ended is also referred to as a "front torque adjustment end time $t_{f\_e}$". On the other hand, when the command rear torque $T^*_r$ is adjusted, a timing at which the adjustment is ended is also referred to as a "rear torque adjustment end time $t_{r\_e}$".

Further, in step S140, the controller 50 executes the torque adjustment. Specifically, the controller 50 switches the command torque from a value according to basic distribution of the control mode of a transition source to a value closer to the total requested torque $T_{sum}$ from the adjustment start timing determined in step S120 to the adjustment end timing determined in step S130.

Further, in step S150, the controller 50 ends the torque adjustment. Specifically, the controller 50 returns the command torque to a value corresponding to basic distribution of the control mode of a transition destination, using the adjustment end timing as a reference point.

In each of the following embodiments, an example in which the distribution adjustment control in FIG. 2 is applied to a more specific situation will be described.

First Embodiment

In the present embodiment, the distribution adjustment control applied to a scene in which the control mode is transitioned from the out-of-phase mode (in which the front wheels are regenerated and the rear wheels are powered) to the in-phase mode (in which the front wheels are powered and the rear wheels are powered) during the acceleration of the vehicle 100 will be described. That is, in the present embodiment, the distribution adjustment control of adjusting the command rear torque $T^*_r$ in the front free running period when the front torque $T_f$ is reversed from negative to positive in accordance with the transition of the control mode will be described.

In particular, in the present embodiment, in step S120 of FIG. 2, the rear torque adjustment start time $t_{r\_s}$ is determined to be a timing at which the command front torque $T^*_f$ (more specifically, the command front torque $T^*_f$ according to the out-of-phase basic distribution) matches a front torque threshold value $T_{f\_th}$.

Here, the front torque threshold value $T_{f\_th}$ is determined by experiments or simulations as a value that the command front torque $T^*_f$ reaches, before a prescribed time before a time point of entering the front free running period (that is, when the command front torque $T^*_f$ becomes zero). In particular, the front torque threshold value $T_{f\_th}$ is determined such that a change in the actual rear torque $T_{r\_re}$ following the adjusted command rear torque $T^*_r$ is equal to or less than a prescribed allowable upper limit in a period from the rear torque adjustment start time $t_{r\_s}$ to the time point of entering the front free running period. The allowable upper limit of the change in the actual rear torque $T_{r\_re}$ is determined such that the change in the actual rear torque $T_{r\_re}$ does not cause a variation in the front-rear acceleration (front-rear G variation) that causes discomfort to the occupant of the vehicle 100.

Further, in the present embodiment, in step S130 of FIG. 2, the rear torque adjustment end time $t_{r\_e}$ is set in a manner of coinciding with a time point at which the front free running period ends (time point at which a rotational play clogs). The end time point of the front free running period can be determined in advance by experiments or simulations according to a characteristic of the driving force transmission system on the front wheel side in the vehicle 100.

Figure 3:
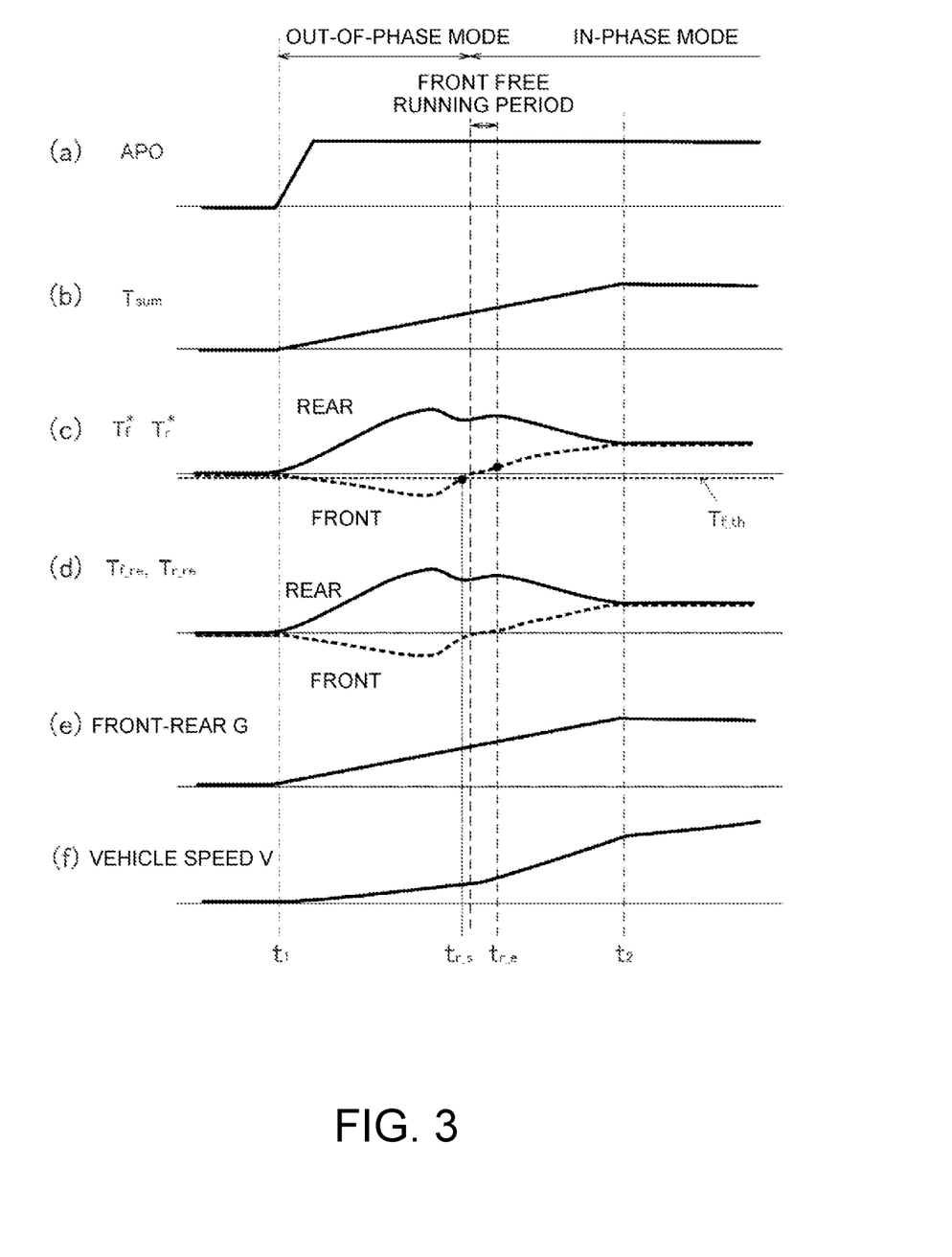
FIG. 3 is a timing chart showing a control result of the distribution adjustment control according to a first embodiment.

FIG. 3 is a timing chart illustrating an example of a control result of the distribution adjustment control according to the present embodiment.

As shown in the figure, after a time $t_1$ at which the acceleration of the vehicle 100 is started, the actual front torque $T_{f\_re}$ and the actual rear torque $T_{r\_re}$ change following the command front torque $T^*_f$ (<0) and the command rear torque $T^*_r$ (>0) according to the out-of-phase basic distribution defined in the out-of-phase mode that is the mode transition source, respectively.

Further, when the rear torque adjustment start time $t_{r\_s}$ is reached, the adjustment of the command rear torque $T^*_r$ is started. Accordingly, the actual rear torque $T_{r\_re}$ gradually increases to match the total requested torque $T_{sum}$ at a time point of entering a later front free running period.

When the vehicle 100 enters the front free running period, the control mode is transitioned from a first out-of-phase mode to the in-phase mode. Accordingly, the command front torque $T^*_f$ maintains the basic distribution (more specifically, follows the switching from the out-of-phase basic distribution before the mode transition to the in-phase basic distribution after the transition). On the other hand, the actual front torque Tire cannot follow the change in the command front torque $T^*_f$ due to the occurrence of the rotational play due to the phase delay of driving force transmission during the front free running period, and is maintained at approximately zero. On the other hand, the actual rear torque $T_{r\_re}$ changes in accordance with the command rear torque $T^*_r$ adjusted based on the rear torque adjustment start time $t_{r\_s}$, and matches the total requested torque $T_{sum}$ from the time point of entering the front free running period to the end time point.

After that, when the end time point of the front free running period (that is, the rear torque adjustment end time $t_{r\_e}$) is reached, the command rear torque $T^*_r$ is returned to a value corresponding to the basic distribution defined in the in-phase mode of the transition destination. Further, at a time t2 after a certain period of time, both the actual front torque $T_{f\_re}$ and the actual rear torque $T_{r\_re}$ converge to a steady basic distribution ratio in the in-phase mode during the acceleration.

Next, an operation and effect of the control according to the present embodiment will be illustrated in comparison with a comparative example.

Figure 4A:
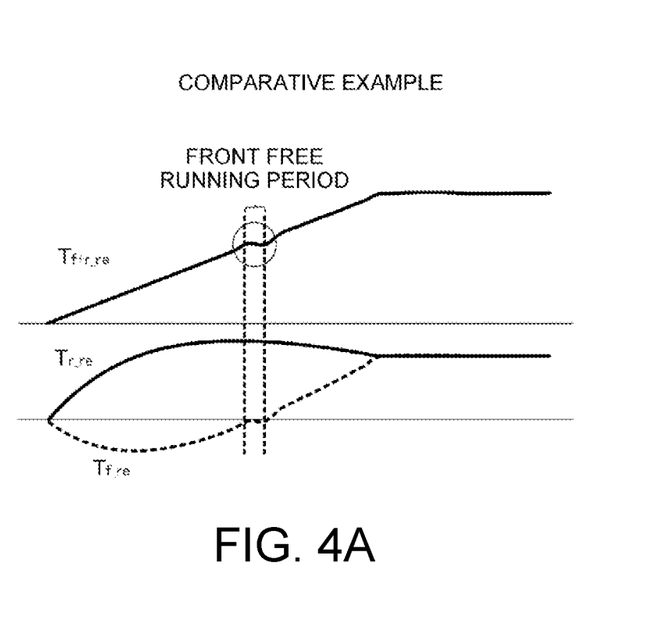
FIG. 4A is a diagram illustrating a control result of a comparative example.
Figure 4B:
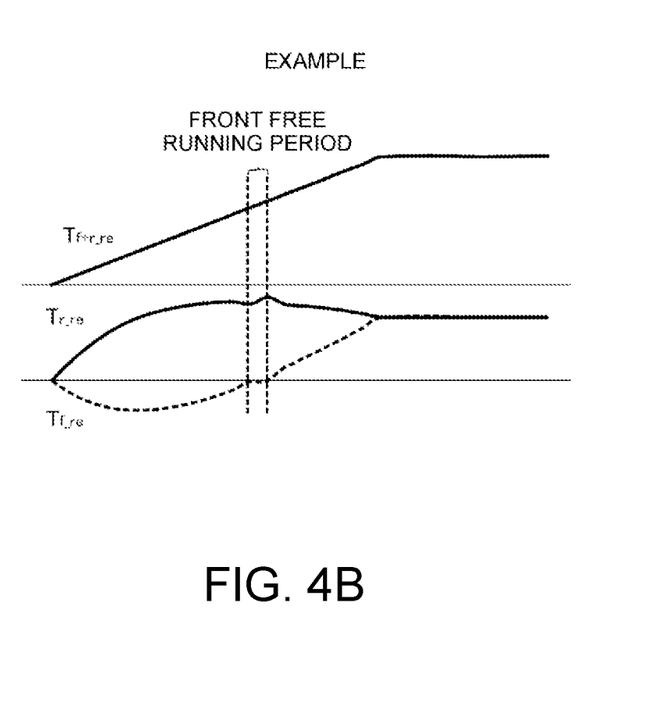
FIG. 4B is a diagram illustrating an effect of control according to an example.

FIG. 4A is a timing chart illustrating a result of control of the comparative example, and FIG. 4B is a timing chart illustrating the operation and effect of the control of an example (control of the present embodiment). In the comparative example shown in FIG. 4A, it is assumed that, in an entire control period (t=$t_1$ to $t_2$) including the front free running period, control (control that does not correct the command rear torque $T^*_r$) maintains basic torque distribution defined in the first out-of-phase mode or the in-phase mode.

As shown in FIG. 4A, in the control according to the comparative example, during the front free running period in which the actual front torque $T_{f\_re}$ does not follow the command front torque $T^*_f$ and is maintained at zero, a difference in the actual sum torque $T_{f+r\_re}$ (front-rear G difference) occurs (see a circled part in the figure).

On the other hand, in control according to the example shown in FIG. 4B, in the front free running period, the actual rear torque $T_{r\_re}$ follows the corrected command rear torque $T^*_r$ and changes to match the total requested torque $T_{sum}$. Therefore, the front-rear G difference in the front free running period is prevented.

Hereinafter, a configuration of the above-described present embodiment and an operation and effect thereof will be collectively described.

In the present embodiment, the torque distribution of the motors 10f and 10r is controlled such that the total requested torque $T_{sum}$ of the vehicle 100 is satisfied by the sum output torque (sum torque $T_f$+r) of the front wheel motor 10f that drives the front wheels 11f of the vehicle 100 and the rear wheel motor 10r that drives the rear wheels 11r.

In this driving force control method, either the in-phase mode in which the respective positive and negative of the output torque (front torque $T_f$ and rear torque $T_r$) of the motors 10f and 10r coincide with each other or the out-of-phase mode in which the respective positive and negative of the output torque of the motors 10f and 10r are different from each other is set. In particular, in this driving force control method, the distribution adjustment control of adjusting the torque distribution is executed when the control mode is transitioned between the in-phase mode and the out-of-phase mode.

Further, in this distribution adjustment control, during a free running period (front free running period) of first output torque (front torque $T_f$) whose positive and negative are inverted at the time of transitioning the control mode, second output torque (rear torque $T_r$) whose positive and negative are not inverted is adjusted to approach the total requested torque $T_{sum}$.

Accordingly, even in the front free running period in which the front torque $T_f$ is not transmitted as actual driving force of the front wheel 11f, the deviation of the sum torque $T_{f+r}$ with respect to the total requested torque $T_{sum}$ can be suitably complemented by correcting the rear torque $T_r$. As a result, even in a scene during the front free running period in a situation in which the total requested torque $T_{sum}$ changes, an occurrence of an unintended front-rear G difference is prevented, and a shock applied to the occupant can be reduced.

In particular, in the present embodiment, the control mode is transitioned from the out-of-phase mode to the in-phase mode during the acceleration of the vehicle 100. In the distribution adjustment control, the command value of the rear torque $T_r$ (command rear torque $T^*_r$) is adjusted such that the actual value of the rear torque $T_r$ (actual rear torque $T_{r\_re}$) matches the total requested torque $T_{sum}$.

Accordingly, during the front free running period, a more specific control logic for supplementing the deviation of the sum torque $T_{f+r}$ with respect to the total requested torque $T_{sum}$ is achieved.

In the present embodiment, when the command value of the front torque $T_f$ (command front torque $T^*_f$) is equal to a prescribed torque threshold value (front torque threshold value $T_{f\_th}$), the adjustment of the command rear torque $T^*_r$ is started. Further, in accordance with the end of the front free running period, the adjustment of the command rear torque $T^*_r$ is completed.

Accordingly, the actual rear torque $T_{r\_re}$ can be suitably set to follow the total requested torque $T_{sum}$ in the front free running period, and after the end of the front free running period, the torque distribution can be quickly returned to the basic distribution (torque distribution for achieving a good vehicle characteristic) defined in the in-phase mode after the transition.

Further, in the present embodiment, the controller 50 that functions as the driving force control device that executes the driving force control method is provided.

The controller 50 controls the torque distribution of the motors 10f and 10r such that the total requested torque $T_{sum}$ of the vehicle 100 is satisfied by the sum output torque (sum torque $T_{f+r}$) of the front wheel motor 10f that drives the front wheels 11f of the vehicle 100 and the rear wheel motor 10r that drives the rear wheels 11r.

The controller 50 sets either the in-phase mode in which the respective positive and negative of the output torque (front torque $T_f$ and rear torque $T_r$) of the motors 10f and 10r coincide with each other and the out-of-phase mode in which the respective positive and negative of the output torque of the motors 10f and 10r are different from each other. Further, the controller 50 executes the distribution adjustment control of adjusting the torque distribution when the control mode is transitioned between the in-phase mode and the out-of-phase mode.

Further, in the distribution adjustment control, during the free running period (front free running period) of the first output torque (front torque $T_f$) whose the positive and the negative are inverted at the time of transitioning the control mode, the second output torque (rear torque $T_r$) whose the positive and the negative are not inverted is adjusted to approach the total requested torque $T_{sum}$.

Accordingly, a configuration of the control device suitable for executing the driving force control method is achieved.

Second Embodiment

Hereinafter, a second embodiment will be described. The same elements as those in the first embodiment are denoted by the same reference numerals, and the description thereof is omitted.

In a driving force control method according to the present embodiment, an example will be described in which based on the distribution adjustment control described in the first embodiment, a zero torque command is executed to maintain the command front torque $T^*_f$ at zero during a front free running period.

Figure 5:
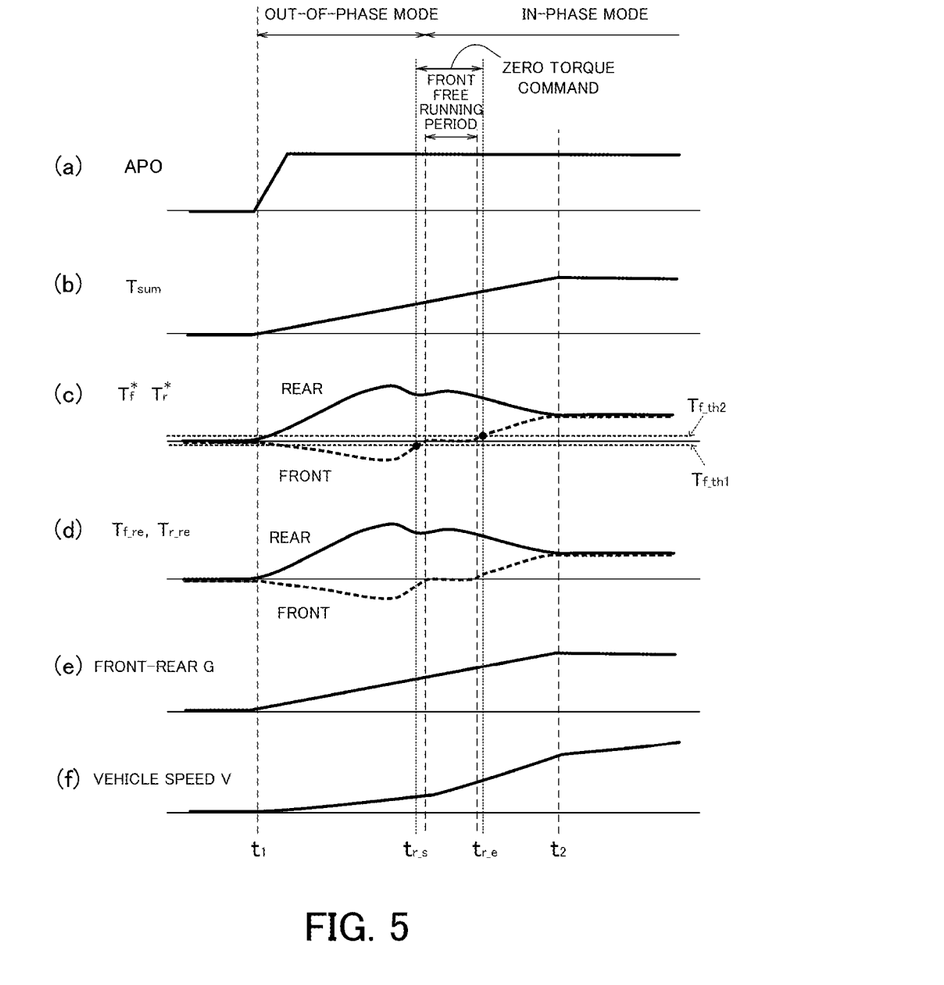
FIG. 5 is a timing chart showing a control result of distribution adjustment control according to a second embodiment.

FIG. 5 shows an example of a control result of distribution adjustment control according to the present embodiment. As shown in the figure, in the present embodiment, the controller 50 starts the zero torque command when the command front torque $T^*_f$ matches a prescribed processing start threshold value $T_{f\_th1}$ (<0). Further, the controller 50 also starts adjustment of the command rear torque $T^*_r$ described in the first embodiment in accordance with the start of the zero torque command.

The processing start threshold value $T_{f\_th1}$ is set to an appropriate value from the viewpoint that a change in the command rear torque $T^*_r$ (actual rear torque $T_{r\_re}$) due to a change in the command front torque $T^*_f$ caused by executing the zero torque command is kept within a range that does not cause a front-rear G variation that causes discomfort to an occupant of the vehicle 100.

Further, when the command front torque $T^*_f$ matches a prescribed processing end threshold value $T_{f\_th2}$, the controller 50 ends the zero torque command. Further, the controller 50 ends the adjustment of the command rear torque $T^*_r$ in accordance with the end of the zero torque command. The processing end threshold value $T_{f\_th2}$ is set to an appropriate value from the viewpoint of quickly returning the torque distribution after the end of the zero torque command to basic distribution defined in the in-phase mode after the transition.

According to the driving force control method of the present embodiment described above, while the front-rear G variation caused by a backlash during the front free running period is prevented by executing the zero torque command, the actual rear torque $T_{r\_re}$ can suitably follow the total requested torque $T_{sum}$ by adjusting the command rear torque $T^*_r$, thereby preventing an occurrence of the front-rear G difference.

Further, since the adjustment of the command rear torque T", is started and ended in accordance with timings of the start and the end of the zero torque command, after the zero torque command is issued, the torque distribution can be quickly returned to the basic distribution (particularly the basic distribution in the in-phase mode) that defines a preferable vehicle characteristic.

Third Embodiment

Hereinafter, a third embodiment will be described. The same elements as those in the first embodiment or the second embodiment are denoted by the same reference numerals, and the description thereof will be omitted. In particular, in the present embodiment, an example will be described in which distribution adjustment control is applied to each of a scene in which a control mode is first transitioned (hereinafter also referred to as a "first half transition") during deceleration of the vehicle 100 and a scene in which the control mode is subsequently transitioned (hereinafter also referred to as a "second half transition").

In particular, in the present embodiment, in the first half transition during the deceleration, the control mode is transitioned from an in-phase mode (in which front wheels are powered and rear wheels are powered) to an out-of-phase mode (in which the front wheels are powered and the rear wheels are regenerated). On the other hand, in the second half transition, the control mode is transitioned from the out-of-phase mode (in which the front wheels are powered and the rear wheels are regenerated) to the in-phase mode (in which the front wheels are regenerated and the rear wheels are regenerated).

Figure 6:
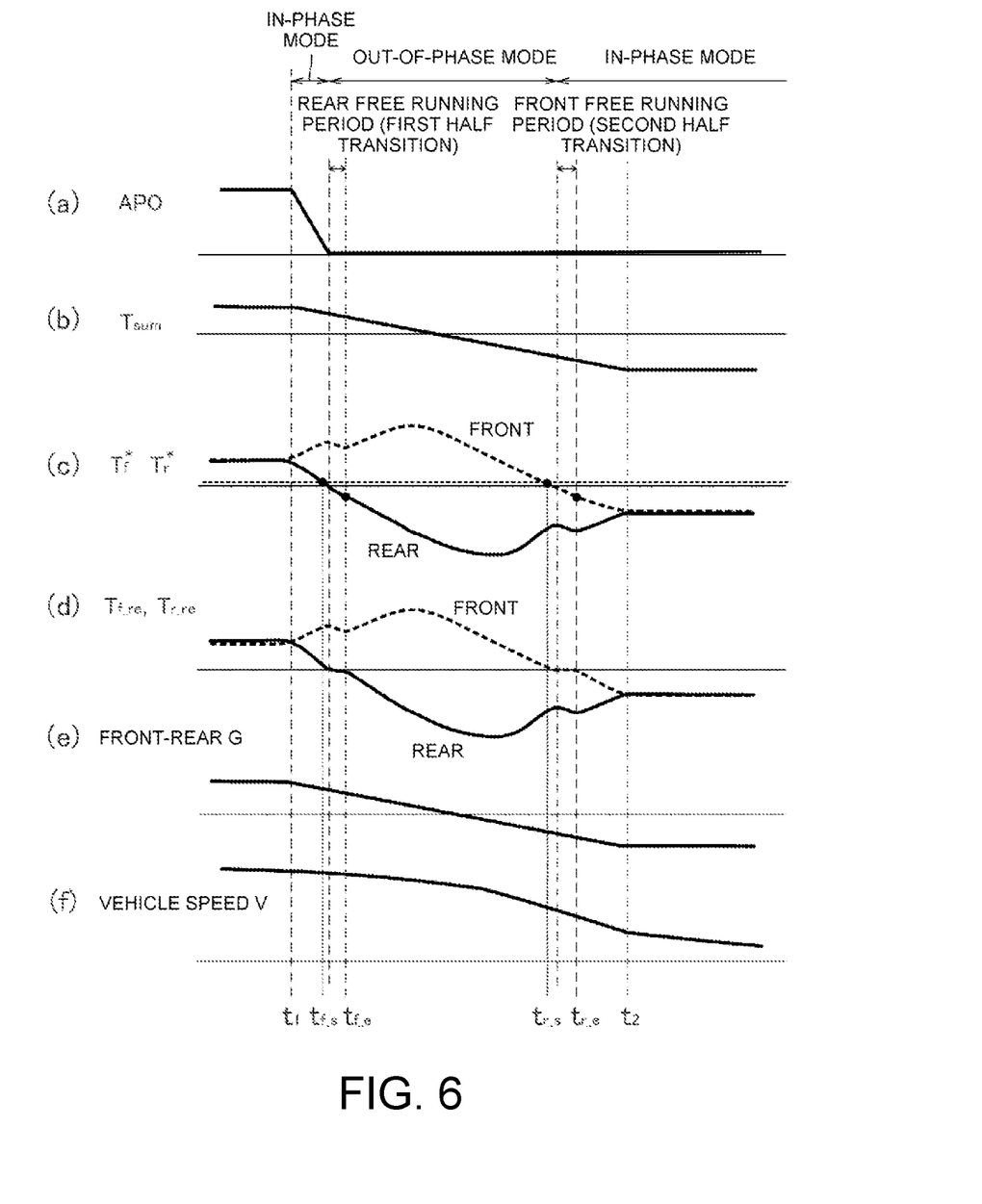
FIG. 6 is a timing chart showing a control result of distribution adjustment control according to a third embodiment.

FIG. 6 shows an example of a control result of the distribution adjustment control according to the present embodiment. As shown in the figure, in the distribution adjustment control in the first half transition, the command front torque $T^*_f$ during the rear free running period is adjusted. A specific method for adjusting the command front torque $T^*_f$ is the same as the adjustment of the command rear torque $T^*_r$ described in the first embodiment, except that an adjustment target is the front torque $T_f$ instead of the rear torque $T_r$.

On the other hand, in the distribution adjustment control in the second half transition, the command rear torque $T^*_r$ during the front free running period is adjusted. A specific method for adjusting the command rear torque $T^*_r$ is the same as the adjustment of the command rear torque $T^*_r$ described in the first embodiment except that a direction in which a sign of the front torque $T_f$ transitions is different.

That is, in the present embodiment, during the deceleration of the vehicle 100, the first half transition in which the control mode is transitioned from the in-phase mode to the out-of-phase mode and the second half transition in which the control mode is transitioned from the out-of-phase mode to the in-phase mode are sequentially executed.

Further, in each distribution adjustment control, a command value of second output torque is adjusted so that an actual value of the second output torque matches the total requested torque $T_{sum}$. More specifically, in the distribution adjustment control in the first half transition, the command front torque $T^*_f$ is adjusted so that the actual front torque $T_{f\_re}$ during the rear free running period matches the total requested torque $T_{sum}$. On the other hand, in the distribution adjustment control in the second half transition, the command rear torque $T^*_r$ is adjusted so that the actual rear torque $T_{r\_re}$ in the front free running period matches the total requested torque $T_{sum}$.

Accordingly, during the deceleration of the vehicle 100 in which the control mode transitions a plurality of times, the actual front torque $T_{f\_re}$ and the actual rear torque $T_{r\_re}$ can be made to suitably match the total requested torque $T_{sum}$ during the rear free running period and the front free running period at each transition time, respectively. As a result, even during the deceleration of the vehicle 100, an occurrence of an unintended front-rear G difference is prevented, and a shock applied to an occupant can be reduced.

In particular, in the present embodiment, the adjustment start/end timing of the command rear torque $T^*_r$ is determined by the same control logic as that of the first embodiment in the distribution adjustment control during the second half transition, so that after the command rear torque $T^*_r$ in the second half transition is adjusted, torque distribution of the vehicle 100 can be quickly returned to basic distribution (distribution for achieving a good vehicle characteristic at the time of the deceleration) in the in-phase mode of the transition destination.

Fourth Embodiment

Hereinafter, a fourth embodiment will be described. The same elements as those in the first to third embodiments are denoted by the same reference numerals, and the description thereof will be omitted.

In the present embodiment, an example will be described in which the zero torque command described in the second embodiment is executed in each scene based on each distribution adjustment control executed in the first half transition and the second half transition described in the third embodiment.

Figure 7:
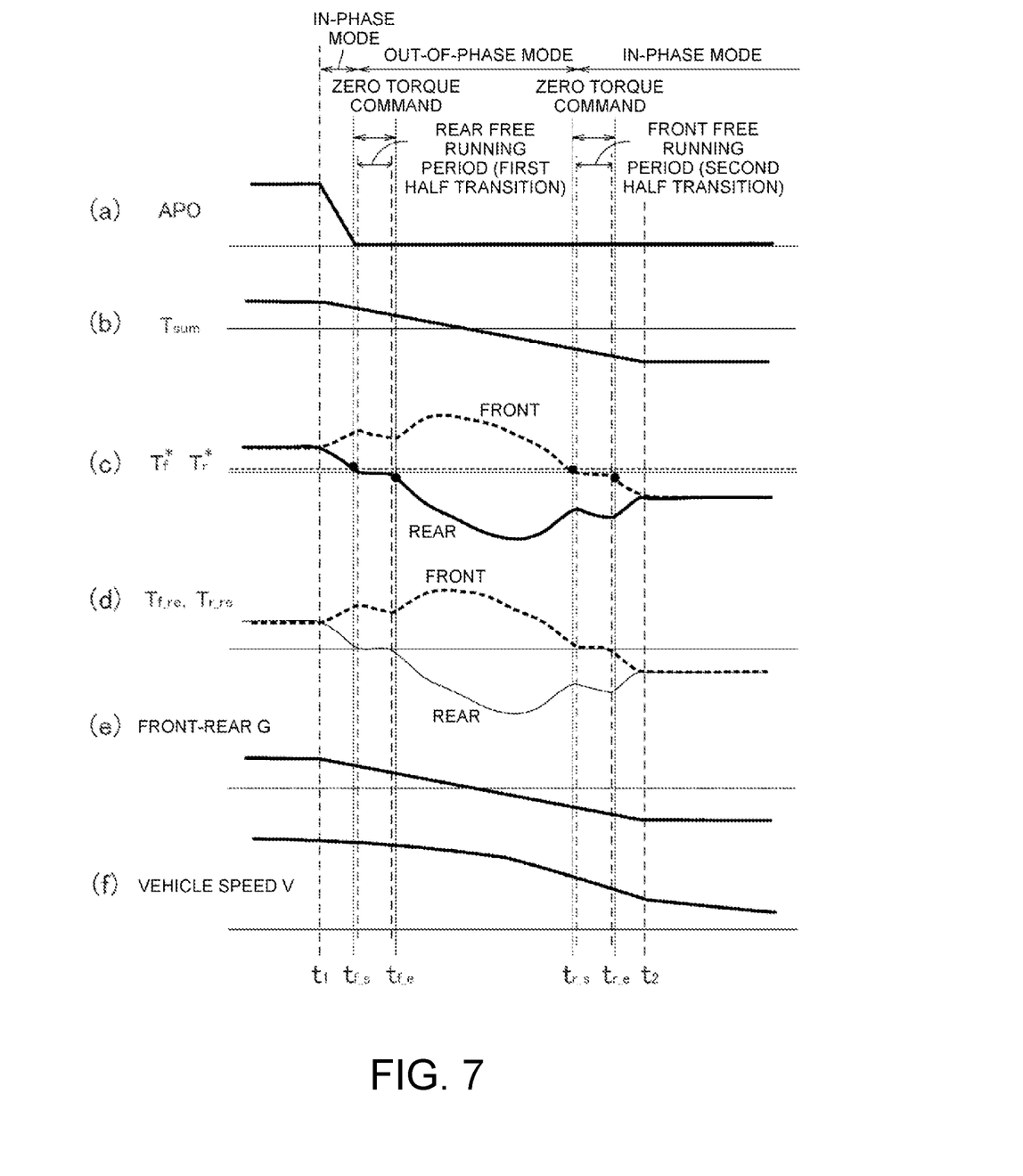
FIG. 7 is a timing chart showing a control result of distribution adjustment control according to a fourth embodiment.

FIG. 7 shows an example of a control result of the distribution adjustment control according to the present embodiment. As shown in the figure, in the present embodiment, the command rear torque $T^*_r$ is maintained at zero in the zero torque command in the first half transition. On the other hand, in the zero torque command in the second half transition, the command front torque $T^*_f$ is maintained at zero. Specific control logic of the zero torque command (relationship between start and end timings and start and end timings of each command torque) is the same as that in the second embodiment.

In this way, by adjusting the zero torque command and the command torque in each of the first half transition and the second half transition during the deceleration of the vehicle 100, it is possible to reduce a variation and a difference in the front-rear G in both the first half transition and the second half transition.

Although the embodiments of the present invention have been described above, the above embodiments are merely a part of application examples of the present invention, and are not intend to limit the technical scope of the present invention to the specific configurations of the above embodiments.

In particular, the specific control logic for determining the timing of starting/ending the adjustment of the command rear torque $T^*_r$ or the command front torque $T^*_f$ in the distribution adjustment control is not limited to those described in the above embodiments, and can be appropriately changed in consideration of balance between the effect of reducing the front-rear G difference and the quick return to the basic distribution after ending the adjustment of the command torque.

The invention claimed is:

1. A driving force control method for controlling torque distribution of a front wheel motor that drives a front wheel and a rear wheel motor that drives a rear wheel to satisfy total requested torque of a vehicle by sum output torque of both motors, the driving force control method comprising:
   setting, as a control mode for determining the torque distribution, either an in-phase mode in which respective positive and negative of output torque of the motors coincide with each other or an out-of-phase mode in which the respective positive and negative of the output torque of the motors are different from each other; and
   executing distribution adjustment control of adjusting the torque distribution when the control mode is mutually transitioned between the in-phase mode and the out-of-phase mode, wherein in the distribution adjustment control,
   an enter time point and an end time point of a free running period of first output torque whose positive and negative are inverted at a time of transitioning the control mode are specified,
   at a prescribed adjustment start timing before the enter time point, a command value of second output torque whose positive and negative are not inverted is switched from a value corresponding to the torque distribution before the transition to a value closer to the total requested torque,
   the command value of the second output torque after the switching is determined such that an actual value of the second output torque matches the total requested torque from the enter time point to the end time point, and
   the prescribed adjustment start timing is determined such that a change in the actual value of the second output torque during a period from the prescribed adjustment start timing to the enter time point is equal to or less than an allowable upper limit of reducing a variation in front-rear acceleration of the vehicle.

2. The driving force control method according to claim 1, further comprising:
   transitioning the control mode from the out-of-phase mode to the in-phase mode when the vehicle accelerates, wherein
   in the distribution adjustment control, the command value of the second output torque is adjusted such that the actual value of the second output torque in the free running period matches the total requested torque.

3. The driving force control method according to claim 1, further comprising:
   executing, during deceleration of the vehicle, a first half transition in which the control mode is transitioned from the in-phase mode to the out-of-phase mode and a second half transition in which the control mode is transitioned from the out-of-phase mode to the in-phase mode in this order; and
   executing the distribution adjustment control in both the first half transition and the second half transition, wherein
   in the distribution adjustment control in both the first half transition and the second half transition, the command value of the second output torque is adjusted such that the actual value of the second output torque matches the total requested torque.

4. The driving force control method according to claim 2, wherein, in the distribution adjustment control,
   when a command value of the first output torque is equal to a prescribed torque threshold value, adjustment of the command value of the second output torque is started, and
   the adjustment of the command value of the second output torque is ended in accordance with an end of the free running period.

5. The driving force control method according to claim 2, wherein, in the distribution adjustment control,
   when a command value of the first output torque matches a prescribed processing start threshold value, a zero torque command is started to maintain the command value of the first output torque at zero, the adjustment of the command value of the second output torque is started in accordance with a start of the zero torque command, when the command value of the first output torque matches a prescribed processing end threshold value, the zero torque command is ended, and the adjustment of the command value of the second output torque is ended in accordance with an end of the zero torque command.

6. A driving force control device that controls torque distribution of a front wheel motor that drives a front wheel and a rear wheel motor that drives a rear wheel to satisfy total requested torque of a vehicle by sum output torque of both motors, the driving force control device being configured to:

set, as a control mode for determining the torque distribution, either an in-phase mode in which respective positive and negative of output torque of the motors coincide with each other or an out-of-phase mode in which the respective positive and negative of the output torque of the motors are different from each other; and execute distribution adjustment control of adjusting the torque distribution when the control mode is mutually transitioned between the in-phase mode and the out-of-phase mode, wherein in the distribution adjustment control, an enter time point and an end time point of a free running period of first output torque whose positive and negative are inverted at a time of transitioning the control mode are specified, at a prescribed adjustment start timing before the enter time point, a command value of second output torque whose positive and negative are not inverted is switched from a value corresponding to the torque distribution before the transition to a value closer to the total requested torque, the command value of the second output torque after the switching is determined such that an actual value of the second output torque matches the total requested torque from the enter time point to the end time point, and the prescribed adjustment start timing is determined such that a change in the actual value of the second output torque during a period from the prescribed adjustment start timing to the enter time point is equal to or less than an allowable upper limit of reducing a variation in front-rear acceleration of the vehicle.

* * * * *